United States Patent
Nussey et al.

(10) Patent No.: US 8,732,250 B2
(45) Date of Patent: May 20, 2014

(54) PROVISION OF SECURE RSS FEEDS USING A SECURE RSS CATCHER

(75) Inventors: Bill Nussey, Smyrna, GA (US); Chris Curtin, Acworth, GA (US)

(73) Assignee: Silverpop Systems Inc., Atlanta, GA (US)

( * ) Notice: Subject to any disclaimer, the term of this patent is extended or adjusted under 35 U.S.C. 154(b) by 1340 days.

(21) Appl. No.: 11/163,565

(22) Filed: Oct. 23, 2005

(65) Prior Publication Data
US 2007/0094365 A1 Apr. 26, 2007

(51) Int. Cl.
*G06F 15/16* (2006.01)
(52) U.S. Cl.
USPC .......................................................... 709/206
(58) Field of Classification Search
USPC .......................................................... 709/206
See application file for complete search history.

(56) References Cited

U.S. PATENT DOCUMENTS

| | | | | |
|---|---|---|---|---|
| 5,917,489 | A * | 6/1999 | Thurlow et al. | 715/809 |
| 6,035,104 | A * | 3/2000 | Zahariev | 709/203 |
| 6,360,254 | B1 * | 3/2002 | Linden et al. | 709/219 |
| 6,675,353 | B1 * | 1/2004 | Friedman | 715/239 |
| 7,047,248 | B1 * | 5/2006 | Tycast | 1/1 |
| 2002/0032738 | A1 * | 3/2002 | Foulger et al. | 709/206 |
| 2002/0032742 | A1 * | 3/2002 | Anderson | 709/206 |
| 2002/0105545 | A1 * | 8/2002 | Carter et al. | 345/752 |
| 2002/0169954 | A1 * | 11/2002 | Bandini et al. | 713/153 |
| 2002/0199095 | A1 * | 12/2002 | Bandini et al. | 713/151 |
| 2003/0097421 | A1 | 5/2003 | Wille | |
| 2004/0088357 | A1 * | 5/2004 | Harding | 709/206 |
| 2006/0129602 | A1 * | 6/2006 | Witriol et al. | 707/104.1 |

OTHER PUBLICATIONS

Dyson, Tom. MailBucket. Archived on Aug. 30, 2004 by the Internet Archive: <http://web.archive.org/web/20040830155220/http://www.mailbucket.org/>. pp. 1-2.*

"Authentication, Authorization, and Access Control". Apache Software Foundation. Archived on Oct. 12, 2004 by the Internet Archive: <http://web.archive.org/web/20041012030930/httpd.apache.org/docs/howto/auth.html>. pp. 1-15.*

"FEEDcombine", i-produce. Archived on May 28, 2005 by the Internet Archive: <http://web.archive.org/web/20050528232942/http://www.feedcombine.co.uk>. p. 1.*

Udell, Jon. "MailBucket: an email-to-RSS gateway", InfoWorld. Sep. 30, 2003. <http://weblog.infoworld.com/udell/2003/09/30.html#a815>, pp. 1-4.*

(Continued)

*Primary Examiner* — Christopher Biagini
(74) *Attorney, Agent, or Firm* — Smith Risley Tempel Santos LLC; Gregory Scott Smith

(57) ABSTRACT

A device that resides behind a firewall and receives content to be further directed towards one or more users, such as high-volume emails. The device captures the incoming content that is delivered over a secure communication channel from an external content source and creates personalized RDF or XML files for the intended recipients. The URLs associated with the files include a unique code that is generated using at least a portion of the addressing information or other parameters of the message. An RSS reader can then be employed to read the content from the RDF or XML file.

9 Claims, 3 Drawing Sheets

(56) References Cited

OTHER PUBLICATIONS

"MailbyRSS Overview", iUpload. Archived on Oct. 20, 2004 by the Internet Archive: <http://web.archive.org/web/20041020052449/http://www.iupload.com/product/mailbyrss.asp>. pp. 1-2.*

Dyson, Tom. Representative Feed from MailBucket. Archived on Oct. 10, 2004 by the Internet Archive: <http://web.archive.org/web/20041010044603/www.mailbucket.org/syncato-general.xml>, pp. 1-16.*

Dyson, Tom. Representative Content File from MailBucket. Archived on Oct. 15, 2004 by the Internet Archive: <http://web.archive.org/web/20041015145523/www.mailbucket.org/xml-dev-160354.html>, p. 1.*

Dyson, Tom. Representative Content File from MailBucket (Source View). Archived on Oct. 15, 2004 by the Internet Archive: <http://web.archive.org/web/20041015145523/www.mailbucket.org/xml-dev-160354.html>, pp. 1-3.*

Dyson, Tom. Listing of MailBucket Content Files. Archived on Oct. 10, 2004 by the Internet Archive: <http://web.archive.org/web/20041010043613/http://www.mailbucket.org/simple/xml-dev>, p. 1.*

"Blogger Help: What is my address/URL?" Blogger. Archived by the Internet Archive on Nov. 18, 2004: <http://web.archive.org/web/20041118225046/help.blogger.com/bin/answer.py?answer=495&topic=16>.*

"What is RSS?" Software Garden, Inc. Jul. 6, 2004. <http://rss.softwaregarden.com/aboutrss.html>.*

Bauer, Elise. "Simple RSS Customizations." Jun. 12, 2005. Accessed on Mar. 8, 2010: <http://www.learningmovabletype.com/a/000458simple_rss_customizations/>. pp. 1-8.*

Anonymous. "generate RSS feeds by category." May 2, 2003. Accessed on Mar. 8, 2010: <http://www.thegirliematters.com/tips/archives/0305/generate_rss_feeds_by_category.php>. pp. 1-9.*

Anonymous. "Bookmarks: Post to your MT blog by Email!!" Jun. 25, 2003. Accessed on Mar. 8, 2010: <http://web.archive.org/web/20040401195442/www.scriptygoddess.com/archives/004001.php#004001>. pp. 1-11.*

Dyson, Tom: "MailBucket", Aug. 30, 2004, pp. 1-2, XP008115493, Retrieved from the Internet: URL:http://web.archive.org/web/20040830155220/http://www.mailbucket.org/.

Anonymous: "Authentication, Authorization and Access Control, Introduction, Access control", May 12, 2001, pp. 160-172, XP002538971, Retrieved from the Internet: URL:http://www.apache-mirror-com/httpd/docs/apache-docs-1.3.23.pdf.zip.

Udell, J.: "MailBucket: an email-to-RSS gateway", Sep. 30, 2003, pp. 1-5, XP008114115, Retrieved from the Internet: URL:http://web.archive.org/web/20031211141916/http://weblog.infoworld.com/udell/2003/09/30.html.

"FEEDcombine", May 28, 2005, pp. 1-2, XP008114116, Retrieved from the Internet: URL:http://web.archive.org/web/20050528232942/http://www.feedcombine.co.uk/.

"iUpload Mail by RSS", Oct. 20, 2004, pp. 1-2, XP008114231, Retrieved from the Internet: URL:http://web.archive.org/web/20041020052449/http://www.iupload.com/product/mailbyrss.asp.

* cited by examiner

PROVISION OF SECURE RSS FEEDS USING A SECURE RSS CATCHER

CROSS-REFERENCE TO RELATED APPLICATIONS

This application is related to, and incorporates herein by reference, U.S. applications for Patent entitled:

"GENERAL PURPOSE RSS CATCHER", filed on Oct. 23, 2005 and assigned Ser. No. 11/163,563, "DELIVERY OF NON-SENSITIVE AND SENSITIVE INFORMATION THROUGH DUAL RECORD RSS", filed on Oct. 23, 2005 and assigned Ser. No. 11/163,566, "DELIVERY OF SENSITIVE INFORMATION THROUGH SECURE RSS FEED", filed on Oct. 23, 2005 and assigned Ser. No. 11/163,567, and "FEEDBACK METRICS FOR RSS FEEDS", filed on Oct. 23, 2005 and assigned Ser. No. 11/163,568, and "PERSONALIZED RSS FEEDS WITH ARCHIVES AND AUTOMATIC CLEANUP", filed on Oct. 23, 2005 and assigned Ser. No. 11/163,570.

BACKGROUND OF THE INVENTION

The present invention is related to the field of Internet communication, and, more particularly, to the field of secure, reliable and controlled communication channels for the electronic delivery of information over the Internet free from vulnerabilities including SPAM and phishing.

Those connoisseurs of the pinkish, rubbery and oddly shaped meat product, or meat-oriented product, called SPAM may not fully understand or appreciate the reasoning behind the application of that name to the hordes of unwanted and unsolicited email messages that bombard your electronic in-boxes. For the rest of us, it totally makes sense. Even the most novice marketer can recognize the power and effectiveness of utilizing email as a medium to "get the word out" and get advertisements in front of potential customers. However, the same features of the current email system and capabilities that make it so useful, are too easily exploited by unscrupulous spammers that simply push as much content as possible to as many destinations as possible. Thus, as is experienced by the rest of the world, our in-boxes are filled with tasteless, undesired, and certainly unwelcome email messages or, also known as SPAM.

Unfortunately, spammers are not only giving legitimate email marketers a bad name, but they are reducing the effectiveness of email as a viable medium for such marketing and, more importantly, reducing its value of email communication to everyone —particularly end users who must plow through garbage to get the stuff they need.

Nonetheless, it is clear that email marketing is a beneficial, powerful, and viable marketing tool and it should be appreciated that not all high-volume email is considered to be SPAM. There are many, top-tier and reputable marketing companies and organizations that send SPAM free high-volume emailing to their customers, subscribers, contacts, colleagues, etc. Among these companies is SILVERPOP, a leading provider of permission-based email marketing solutions, strategy and services. Bulk email is a type of high-volume email that generally is focused on sending large volumes of the same message to many recipients. High-volume email can include bulk email, but also includes applications in which a large number of customized messages are sent to various recipients. High-volume email solutions allow for email marketing systems to push notices, newsletters, and other legitimate content to interested parties that have granted permission to the marketers. As a result, SILVERPOP provides a lower cost communication channel for the delivery of such content, at least lower than typical call centers or print, for clients to talk with their customers.

Benefits associated with the use of email and high-volume email marketing over traditional marketing include significant reductions in the cost of communicating with customers, reductions in the number of calls into your call center while driving customer loyalty, and assurance that every customer touch point is relevant, timely, legally compliant and brand appropriate. These are common benefits that are available through email marketing; however, the dramatic growth of SPAM threatens the usefulness of this marketing technique. Irregardless of the dramatic increase in the use of SPAM, most true marketers will tell you that unsolicited and annoying emails are not effective activities for serious marketers with real customer relationships and real brands. Email marketing, similar to all marketing, is about long-term relationships, customer communications and unprecedented improvements in customer loyalty and life-time value. What is needed in the art is a technique to provide for electronic and email marketing that allows the marketing touches to be distinguished from SPAM.

Today, individual SPAM victims have little recourse. SPAM messages may include a link to select if you wish to have your email address removed from the spammer's list. However, by traversing that link, you basically notify the spammer that you are alive and viable, that your email address is valid and policed, and such action may only encourage additional SPAM to be delivered to your email address or, even worse, may support the selling of your contact information to other spammers. So, most SPAM victims must simply browse through their in box and delete the emails that appear to be SPAM.

Another alternative to manually cleaning the SPAM out of your in-box is to utilize a SPAM filter. Most email clients or email applications include user defined SPAM filters. Such filters allow a user to forward email to different boxes or move email to a different folder based on header information associated with the email. Thus, emails from certain email address, domains, specific subject lines, keywords etc. can be detected and treated differently. In addition, some email applications, such as MICROSOFT OUTLOOK, allow you to tag certain email senders as being on a junk mail list. Thus, there are a variety of SPAM filters including header filters, language filters, content filters, etc. However, the available techniques require significant effort and policing on the part of the user. In addition, even with considerable effort on the part of the individual, SPAM filters are not always as effective as desired. In addition, application of the filters can also result in treating legitimate and desirable email as SPAM. This could result in significant consequences to the user.

Other techniques to control the influx of SPAM include SPAM filters and black list techniques that are employed by email hosting systems or ISPs. Systems such as this provide relief to the end user in that the filtering is done by the ISP or hosting system rather than the user. However, similar to the locally resident and defined SPAM filters, these systems can result in causing legitimate and desired email messages to be filtered and not reach the recipient. Thus, there is a need in the art for a technique to prevent a user from being inundated with SPAM, but that does not adversely affect the user's ability to receive the desired email, including desired and welcomed email marketing or high-volume emails.

Another related but even more problematic exploitation of email is referred to in the industry as phishing. A common development with many companies that provide Internet based services is a need to prompt customers to provide information or take actions. For instance, a banking company may request a user to visit the banks website so that the customer can tend to recently received electronic bills. It is not feasible for such companies to expect their customers to periodically visit the company's website on their own in an effort to determine if such a need exists. Customers are generally too busy and have too many competing interests. Thus, email is an ideal solution for companies that provide Internet based services. By sending an email message to the customer, the service provider can notify the customer of the action that is required, and prompt the customer to visit the service provider's website to perform such action. However, because the validity of a source sending an email message cannot be guaranteed, the end customer is vulnerable to phishing.

Phishing exploits the inherent inability to ensure the validity of an email sender. As an example, a user may receive an email indicating that it is from a legitimate service provider that the customer uses. When the customer opens the email, he or she is presented with information that looks official. The information typically includes a link to a website that requests the user to provide personal information, such as performing account number verifications or entering the user's PIN or password and user ID to access the system. This information is then recorded by the phisher and then used in an adverse manner against the user. Clearly there is a need in the art for a technique for Internet based service providers to contact their customers and provide them with notice that they need to take an action or simply visit the company's website. However, being able to confirm to the customer that an email contact is an authentic communication from the service provider is a difficult challenge. Thus there is a need in the art for such a technique.

In addition, such a technique should also be able to provide other, state of the art criteria or functions that have become common place and expected in email communication. Such criteria include the ability to transfer multiple kinds of content, including text, graphics and rich media, and the ability to transfer personalized content. In addition, the authentication of the communication source needs to be performed in a transparent manner, meaning that the users do not need to take any additional actions, or the additional actions are minimized, and that leverages existing Internet security solutions. Finally, the authentication of the communication source solution needs to provide secure delivery, meaning that the delivery of the content cannot be intercepted either at the Internet Service Providers system, corporate data center, or by hackers using Internet sniffers or other similar techniques.

Another problem that is associated with the use of spam filters or anti-spam systems is that there is a probability that legitimate email messages may be blocked. The term used to identify legitimate emails that have been blocked is "false positives". In practice, some have suggested that stopping the delivery of SPAM to a system is not nearly as difficult of a task as avoiding false positive results. Eliminating false positives is a very difficult problem to address for email recognition and filtering technologies and failures on the functionality of this effort can be catastrophic in a business setting. A false positive result can quite costly to a company if they are losing business opportunities that were attempted to be delivered via email.

Most systems that are employed for eliminating junk email will most likely create false-positives and thus result in blocking legitimate email. The GIGA INFORMATION GROUP has indicated that based on real world testing, the rate of false-positives can be as high as 34%. ASSURANCE SYSTEMS has indicated that even the better junk email processing systems will still result in blocking 6% to 8% of legitimate email.

As has been described, the Internet and more particularly, email technology has been whole heartedly adopted by mass marketers in the form of high-volume email marketing and has also proven useful for Internet service providers to reach out and touch their customers. However, these advances in the art are deficient in that they are vulnerable to SPAM, phishing and deliverability. Thus, there is a need in the art for a solution that can not only be as effective as or exceed the present email technology techniques, but that can also eliminate the vulnerability of users to SPAM and phishing. As will be described herein, the present invention is such a solution.

Another communication and information delivery technology that has been rapidly gaining popularity is RSS feeds. Although some may argue what the acronym RSS actually stands for (RDF Site Summary, Rich Site Summary, Really Simply Syndication), the bottom line is that RSS is a relatively simple specification that uses extensive markup language (XML) to organize and format web-based content in a standard manner. Content owners create an RSS feed, an XML formatted web page or file which usually consists of titles and brief descriptions of various articles or content that is available in various locations on the site. The XML formatted web page also includes links to these various articles. More specifically, an RSS feed is then an XML file with only a few fields allowing users to scan the title or headline, author and usually a brief abstract. In addition, if the user so desires, he or she can access the full article or document by actuating the retrieval address (i.e., an URL) that is associated with the entry in the XML file. Although RSS was originally designed for periodical publications, it has been used to deliver updates to web sites, blog articles, new learning objects and a host of other novel applications. In short, anything the owner wants "pushed" to the world. There are several similar standards that have been introduced for RSS, including RSS 1.0, RSS 2.0 and Atom. Although the term RSS is used extensively throughout this description, it should be understood that the present invention is not limited to the use of any one version or release or RSS but rather, that the present invention can incorporate the various releases or any similar, not yet released formats, as well as similar technologies. In addition, the files that are created and that support and RSS feed can vary depending on the actual implementation or version of RSS that is being utilized. For instance, RSS 2.0 utilizes XML files whereas RSS 1.0 utilizes RDF files, which are a version of XML files. Throughout this specification, reference to an XML file and an RDF file may be used interchangeably.

Content available through an RSS feed is obtained using a software client called an RSS reader or aggregator. The RSS feeds are based on an RSS standard and thus, they can easily be read by an RSS feed reader and most RSS feed readers can handle all of the current RSS standards. An RSS reader or aggregator is usually a stand alone program (though it may be integrated with an email program, an internet browser or other communications program) that periodically and automatically searches the Internet for new additions to any site to which the end user has subscribed. Some RSS readers will provide a popup window message when new material arrives on a subscribed RSS feed. Some RSS readers will check the RSS feeds for new content on a scheduled basis, while others wait until they are checked or actuated by the end user. Typically, the RSS readers can be customized as to the frequency of site checking and the ways that selected content is displayed. A user can subscribe to as many RSS feeds as they wish. RSS readers generally allow the user to define the manner in which the information is displayed. For instance, the information can be sorted by date and/or by the publisher of the data.

RSS feeds are similar to simply accessing web content through a browser but there is one, very significant difference. With an RSS feed, when any new material is available, the RSS feeds provide a very simple way for RSS readers to see when and what material has changed. RSS feed readers allow you to subscribe to feeds that you know contain important or useful information, and your RSS reader will notify you immediately whenever new content for your subscriptions is available. In short, once you've identified a useful resource that publishes an RSS feed, you can virtually skip searching for it altogether. In addition, the basic characteristics of RSS feeds allow users to be updated or informed of critical, real-time information as it becomes available. Advantageously, because the content coming from an RSS feed is controlled by the source, there is inherently a level assurance that the content can be trusted. The application of a technology such as an RSS feed could greatly benefit the delivery of advertisements and notifications from Internet service providers. Thus, there is a need in the art to utilize such a technology to provide for the delivery of advertisements and to allow Internet service providers to deliver trusted communications to customers.

As is well known in the art, if a company's computer is simply connected to a global network, it is extremely vulnerable to hackers. As a result, companies have added password protection to ensure that private information is only available to users who authenticate themselves. Additionally, software called "firewalls" is put in place to prevent hackers and other nefarious people from breaking into a company's data systems and stealing or corrupting the information. The invention described in the above-referenced United States Patent Application describes a general purpose RSS catcher that can be used to capture such high-volume emails and convert them into RSS feeds for their clients. However, if a company wishes to obtain the protection of a firewall and a company's proprietary password scheme but still enjoy the benefit of receiving content from a content source running at a vendor's data center, the RSS catcher must be placed behind the firewall in a company's data center. Such placement will bolster the confidence that the RSS feeds are immune to being hacked, spoofed or otherwise tampered. Thus, there is a need in the art for a solution to provide an RSS catcher that can reside behind a firewall while still able to receive content source material from a system not located behind the company's firewall.

Another problem facing companies and computer users is proving that a website or a communication is truly from the company. Web technology like digital signatures and secure socket layer (SSL) operate to ensure that communications with a company are truly from that company. Such authentication is generally transparent to users and is, thus, widely used. Thus, there is still a further need in the art for placement of an RSS catcher behind a company's firewall, wherein all of the authentication systems in place at the company automatically benefit the RSS feeds generated by the catcher. Filling this need in the art would help increase a user's confidence that the RSS information being picked up from a company's website are, in fact, from that company and not a hacker.

BRIEF SUMMARY OF THE INVENTION

The present invention addresses the above described needs in the art by providing a technique to electronically deliver information or content to users in a manner this is as convenient and easy to use as email, but that is immune to SPAM, deliverability problems and phishing vulnerabilities as well as other short-comings of email. More specifically, the present invention utilizes an open standard technique to provide RSS feeds that are personalized for particular subscribers, and provide for the trusted and user controlled and selected content from various sources.

One aspect of the present invention is a secured RSS catcher that resides behind a secured firewall and is afforded the protection mechanisms that are put into effect for the company's computing platform. Access to the RSS feeds created by such an RSS catcher is attained through a secure connection, such as over a secure socket layer communication utilizing encryption and tunneling. Advantageously, the information received over SSL, or other secured connection can be trusted and incorporated into the RSS catcher. The received information can then be made available to various customers through an RSS feed. Thus, the present invention provides, among other things, a secured RSS catcher that resides behind the security of a firewall and that can only be accessed through a secure communications channel. In addition, password protection can also be incorporated into the RSS feed. At one level, the main RSS file or the index file can be password protected and as such, a user cannot access the RSS feed without providing the password. In addition, at a second level the actual content files that are linked to within the RSS index file can also be password protected. Alternatively, only the actual content files can be password protected and the RSS files can be accessed without the additional security requirements. Thus, depending on the embodiment, the RSS feed itself may require a password with each specific user's feed requiring that specific user's password. Also, the HTML files that contain the full messages can be password protected on a per user basis as well.

One aspect of the present invention is the provision for the controlled delivery of content to a user wherein content items directed towards an address identifier are received. For each such content item, a database is examined, or simply the existence of an associated URL is searched for, to determine if content directed towards this address identifier has been previously received. If content items that include the address identifier have not been previously received, then an RSS based file, such as an RDF or XML file is created with the URL including a unique identifier that is generated using the address identifier or some other user specific seed. Portions of the content of the content item is then used to create an entry in a main RSS based file while other portions may be placed into a separate HTML (or XML) based file that can be linked to from the main RSS based file. If content items have been previously received for that address identifier, the URL associated with the identifier is determined and the RSS based file addressable with the URL is modified to include an entry for the content item. Thus, a unique RSS feed is created for each uniquely addressed content item. For email messages, this would create a unique RSS feed for each uniquely addressed email. In other embodiments, a unique RSS feed can be created based on other criteria. A few examples include, but are not limited to, to/from address pairs, from addresses, domain portions of the "to" addresses, domain portions of the "from" address, key words in the subject or body of the message, etc. Advantageously, such variations allow for RSS feeds to be created that provide differing content. For instance, an RSS feed with all emails received from eBay, or an RSS feed with all emails directed towards a particular recipient but from a particular company.

DETAILED DESCRIPTION OF THE INVENTION

The present invention is directed towards the delivery of electronic information to users in a manner that is immune to the delivery of SPAM and phishing. More specifically, the present invention is directed towards a secure RSS catcher that is operable to convert high-volume, broadcasted data or other content into RSS feeds and to provide user directed inquiries and requests from Internet service providers in a manner that assures the sender is authentic. The secure RSS catcher resides and operates behind a web based company's firewall and is only accessible via a secure connection, such as SSL employing encryption and tunneling. As such, the web based company can ensure that a customer subscribing to the RSS feed can fully trust the provided content. Advantageously, the security and hack-resistant measures taken to secure the company's web site all bolster the confidence in the RSS feed.

Now turning to the drawings in which like labels and numbers refer to like elements throughout the several views, various embodiments and aspects of the present invention are described more fully.

Figure 1:
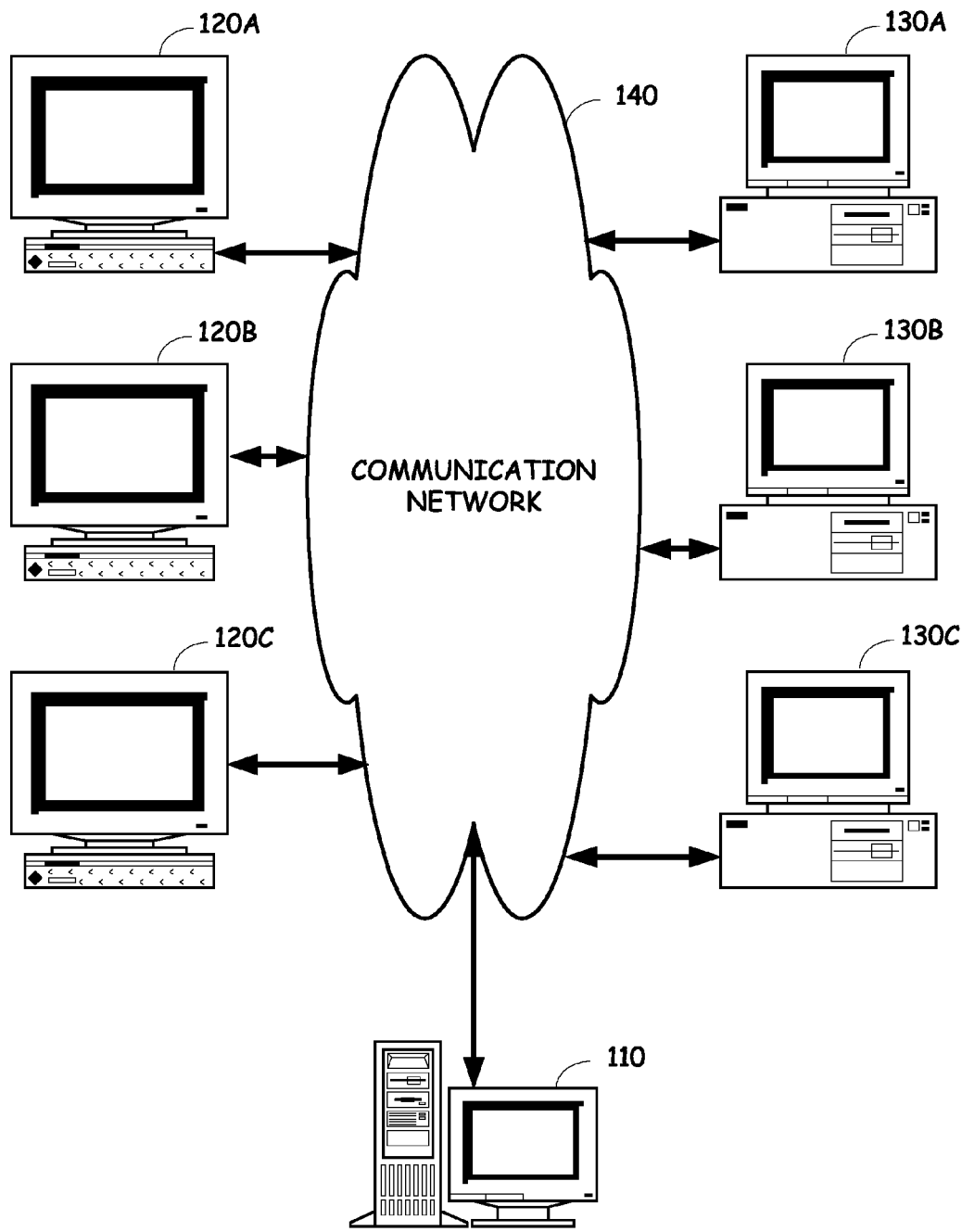
FIG. 1 is a system diagram illustrating the environment for a typical content distribution and management system.

FIG. 1 is a system diagram illustrating the environment for a typical content provider system. One example of a content provider may be a high-volume email server but, other types of content providers include other RSS type feeds, news sources, proceedings summaries, a pulled information provider or the like. A content source 110 may be communicatively coupled to one or more additional content source systems 120A-C and one or more targets or recipients 130A-C. For example, using a high-volume emailing system, the additional content source systems may be marketing companies that employ a high-volume email server 110 for the delivery of information to recipients or a group of recipients. The recipients may be customers of a particular client of the marketing company, may be members of a private club, may be students in a university, may be purchasers of a particular product, or any of a variety of groups of parties. The marketing companies can interface to the high-volume email server 110 over a communications network, such as the Internet 140 or can be connected to the server through other means, such as but not limited to a VPN, a direct connection, a shared connection, a wireless connection, etc. In addition, it should be appreciated that the high-volume email server 110 may actually be incorporated into the marketing company system 120 or, the data required to generate a high-volume email delivery may be provided by a marketing company to the high-volume email server as a flat file through an FTP transfer or a diskette. Those skilled in the art will appreciate that other delivery mechanisms may also be employed.

An ultimate function of a high-volume email distribution system is to manage a set of recipients, provide a platform or mechanism for identifying recipients out of the domain of recipients for a particular email message, and in some instances, provide customization, personalization and creation of unique email message for each recipient as part of the high-volume delivery. For instant, in a high-volume email system developed by the assignee of the present invention, a recipient domain database is maintained within the high-volume email server. For each recipient in the database, various information and parameters about the recipient is maintained. The information provided is typically controlled by the customer, however in other embodiments, some of the information may be provided by the recipients, the high-volume email service provider, or from parties that have sold or provided the recipient database information.

The information or entries in the database are used to control the delivery of the high-volume email messages. This is accomplished by formulating queries on the various fields in the database. Thus, any particular high-volume email distribution can be delivered to a select portion of the domain of potential recipients simply by formulating a query for the selection of the recipients. Advantageously, this enables the high-volume email distribution to be more accurately targeted towards interested parties and as such, emails received through this system are relevant to the receiving party. In one version of the high-volume email system provided by Silverpop, the database of recipients includes up to 400 fields that can be used to characterize each recipient. The marketing company is free to customize the various fields to maximize the control and granularity of the email delivery.

High-volume email systems may also include further delivery controls. For instance, to protect a customer from being berated with an overwhelming amount of email, the high-volume email system may allow the recipient and/or the company to enter a parameter that limits the number of messages to be delivered to the recipient. For instance, a particular recipient may want to limit the system to 2-4 emails per month. Likewise, a company may decide to send no more than 1 email to each customer on a weekly basis. High-volume email systems may also include further controls on the number of email messages that the system will push over a particular time period. In addition, the high-volume email system may be equipped to handle campaign management which includes the ability for the system to send messages in accordance with particular parameters, such as the anniversary of a customer, the customer's birthday, thirty days after a customer makes a purchase, etc. Another aspect of high-volume email systems is the ability to include, or forcibly include in the messages, certain language such as legal disclaimers or the like—this is referred to as CAN-SPAM. One skilled in the art can readily see the benefits of a high-volume email system as described above in reaching customers and potential customers, and likewise, it is also clear how such a system can be abused. Rather than using queries for intelligently and selectively identifying a group of recipients for a high-volume emailing, and rather than limiting the number of messages that can be sent from the high-volume email system, an entity engaging in the practice of sending SPAM, can simply hit every party listed in the database with every message that is being sent out. Thus, any person that has obtained and utilizes an email box on the internet with an assigned email address, runs the risk of others discovering their email address and then placing that email address into a recipient database owned and exploited by SPAM senders. To avoid destroying their reputations, companies such as SILVERPOP must carefully scrutinize the users of their system and impose severe contractual requirements on them to assure that they do not engage in the practice of using the system for sending SPAM.

In the world of technology, and even in the world of Internet technology, RSS feeds are a relatively young development. Similar to most newly introduced technologies, no matter how technically sound and advantageous the technology is, the early adopters are generally only those that are the most technologically sophisticated. It takes a significant amount of time for new technology to catch on and become adopted by the majority of users. Internet marketers are just now beginning to focus on the benefits of using RSS feeds for the delivery of their information but as of yet, it is not widely adopted. As it stands, Internet marketing companies have significant amounts of money invested in their current high-volume email delivery systems. Thus, it is unlikely that in the near future, these systems will be totally abandoned for the newer RSS technology. However, as is shown herein, the present invention provides a solution that allows marketers to gain the benefit of their current high-volume email systems, and yet, also obtain the benefits available through the RSS feed technology.

The high-volume email system is simply one example of a content source that can be utilized by the present invention. A key aspect of the present invention is that the RSS catcher resides behind a secure, virtually hack-proof firewall. Companies that provide confidential information to customers through the Internet need to be able to provide such information in a secured manner. Oftentimes, to ensure that a customer is eligible to receive the confidential information, the accessing customer is required to provide other confidential information such as passwords, account numbers etc. However, as previously described, the practice of communicating with such customers through email can leave customers quite vulnerable to phishing. Thus, the companies employ the use of RSS feeds that are protected behind a firewall.

It will be appreciated that although placing an RSS feed behind a secure firewall provides a secure and trusted communications medium, it also greatly limits the ability of the company to provide information. For instance, marketing companies, content provider companies, high-volume email companies and others that the web enabled companies employ to provide information to their customers are cut out of the communications channel leaving the web enabled company with the burden of generating and providing the content. The secure RSS catcher of the present invention enables the web enabled company to again employ the marketers, content providers and high-volume email companies. The content provided by such companies are simply provided to the RSS catcher through a secure communication channel and as such, the content and source of the content are trusted. The secure RSS catcher operates to receive the content feeds from the various secure communication channels and generate/augment RSS feeds for the customers.

Figure 2:
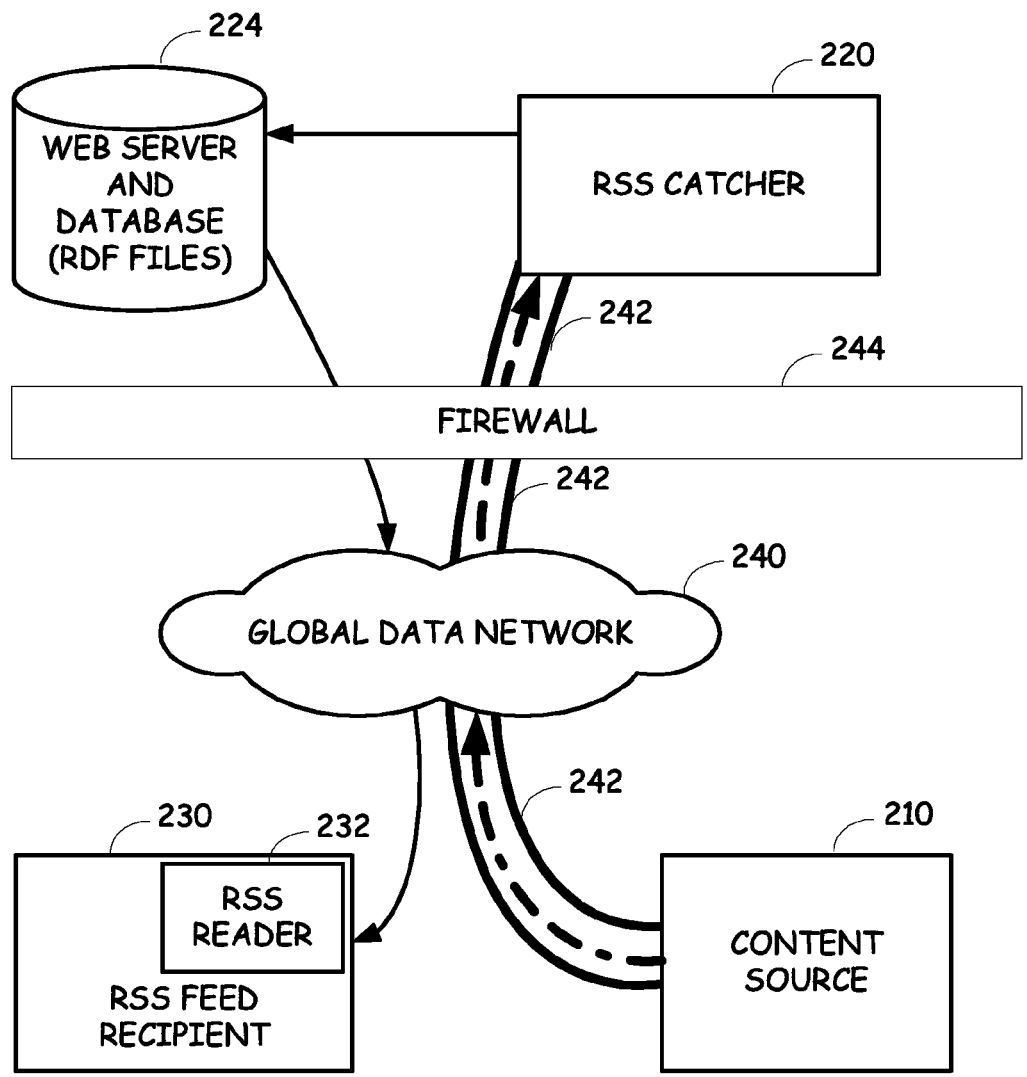
FIG. 2 is a system diagram of the employment of the secure RSS catcher aspect of the present invention, integrated into and operating in conjunction with a content source over a secured communication channel.

FIG. 2 is a system diagram of the employment of the secure RSS catcher aspect of the present invention. A content provider system 210, similar to the exemplary system described above, is configured to provide content to various customers. The content delivery system 210 delivers content targeted for individual recipients or groups of recipients over a data network 240 through a secure communications channel 242. In an exemplary embodiment, the content is provided over a VPN employing encryption and tunneling. The content may also be provided in a generic manner and the system within the firewall may determine the proper recipients for the content. It should also be appreciated that in some embodiments, the content may even be generated on the secure side of the firewall. In one embodiment, the communications between the content source and the secure RSS catcher can be done using standard email protocols like SMTP. In doing so, companies may find it much easier to manage their firewalls as most firewalls are pre-configured to allow standard email traffic through.

A secure RSS catcher 220 is communicatively coupled to the data network 240 over the secure communications channel 242 through firewall 244 and is operable to receive the incoming content from the content system 210 and convert the content into RSS feeds. This can be accomplished in a variety of manners depending on the actual format and type of content. For example in an embodiment that processes email messages, the RSS catcher simply takes each unique email message and generates a unique RSS feed for that message. In another embodiment, groups of related email message can be formed into a single RSS feed. For instance, all emails that contain similar subjects, or that originate from a single source such as the same company or that are marked as urgent could be grouped into a single RSS feed. Using these embodiments of the present invention, recipients can gain access to the email messages by subscribing to the one or more RSS feeds. In yet another embodiment of the present invention, the email messages are used to generate RSS feeds based on the identity of the intended recipient. In this embodiment, an RSS feed for the email recipient is created and the recipient can access the email, if desired, by subscribing to the RSS feed. These embodiments are referred to as a personalized RSS feed for high-volume email originated messages. It should be appreciated that, a single email message can be received and then converted into multiple RSS personalized feeds for different parties and/or a single email can be received and converted into a single RSS feed (non-personalized) that multiple parties can access.

In other embodiments, a proprietary format for the content can be defined. For instance, mass deliverable content can include a field for each of the potential recipients or can simply include an identifier of a group of recipients or even indicate that this is available for all potential recipients. The content may include a summary field, a body field, a title field, etc. The RSS catcher, programmed to process the proprietary formatted content, operates to strip the content and create entries in the respective RSS files for the various recipients. In addition, the RSS catcher can operate on well known and standard file or content formats.

Figure 3:
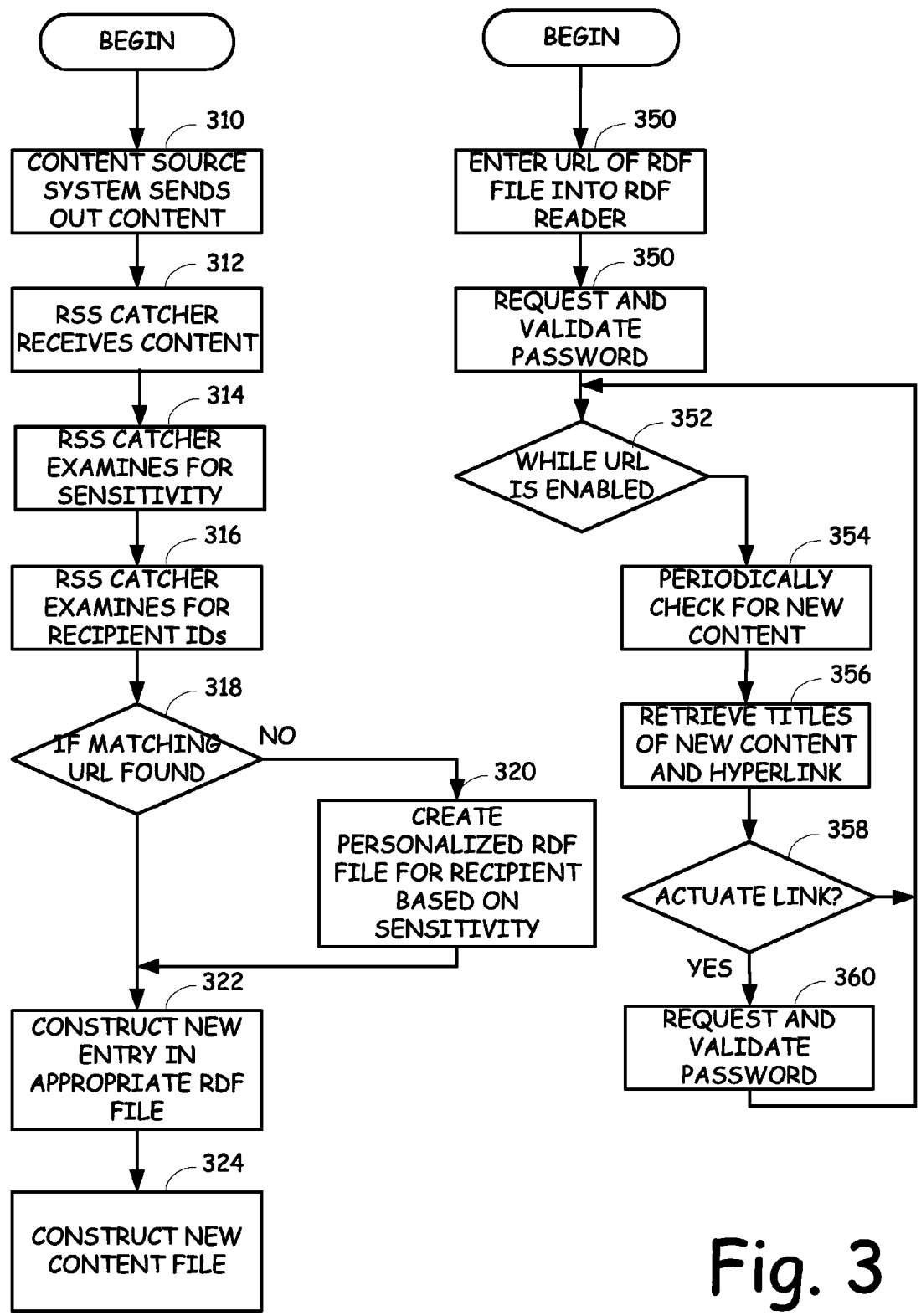
FIG. 3 is a flow diagram illustrating the steps involved in the personalized RSS feed for delivery of content.

FIG. 3 is a flow diagram illustrating the steps involved in the personalized RSS feed for content received by a secure RSS catcher. Processing begins at step 310 with a content source system 210 sending out data to a secure RSS catcher over a secure communications channel. The data is transferred over a data network 240 over a secure channel 242 and through a firewall 244 to the RSS Catcher 220. The RSS Catcher 220 is setup to receive the output from the content source system 210. The RSS Catcher 220 examines the received content to identify the intended recipients at step 314. This step involves, at a minimum, examining the data for recipient identifiers. Once the recipient identifiers are identified, the identifiers are examined at step 316 to determine if there is an entry in the data base for the identified recipient or if there is already an existing RSS feed for the identified recipient. If a match is found, processing continues at step 320, otherwise processing continues at step 318.

At step 318, a content for the identified recipient is being received for the first time. In response to the reception of the content, the appropriate RDF or XML files are created for the recipient and processing continues at step 320. For the purposes of this example, it will be appreciated that an RSS feed consists of two file types. One file type, an index or main file, houses the bulk of the RSS feed information—the headers, indexes, abstracts, links, etc. The entries within the index or main file, referred to in this example as the XML index file, may typically include a link to another HTML or XML based file, or content file, that includes a full copy of the article, publication or data that is being referenced in the XML index file.

Resource Description Framework (RDF) is a language for representing information about resources in the World Wide Web and XML is a standardized markup language. RDF is particularly intended for representing metadata about Web resources, such as the title, author, and modification date of a Web page, copyright and licensing information about a Web document, or the availability schedule for some shared resource. However, by generalizing the concept of a "Web resource", RDF can also be used to represent information about things that can be identified on the Web, even when they cannot be directly retrieved on the Web. Examples include information about items available from on-line shopping facilities (e.g., information about specifications, prices, and availability), or the description of a Web user's preferences for information delivery. It should be noted that although the use of RDF or XML files is described, other formats, as well as newly emerging formats can also be used and although embodiments of the present invention are provided with reference to the use of RDF, they are provided as non-limiting examples only and those skilled in the art will appreciate that the other formats may also be utilized.

A user may have the need to access a wide variety of information on the Web on a day-to-day basis, such as schedules, to-do lists, news headlines, search results, "What's New", etc. As the sources and diversity of the information on the Web increases, it becomes increasingly difficult to manage this information and integrate it into a coherent whole. RSS is an RDF vocabulary that provides a lightweight, yet powerful way of describing information for timely, large-scale distribution and reuse.

RDF integrates a variety of applications from library catalogs and world-wide directories to syndication and aggregation of news, software, and content to personal collections of music, photos, and events using XML as an interchange syntax. The RDF specifications provide a lightweight ontology system to support the exchange of knowledge on the Web.

At step 318, the identification of the recipient for the received content does not have an XML index file associated with it. Thus, a new XML index file is created and stored on the web server 230. In an exemplary embodiment, the name of the XML index file incorporates the name of the intended recipient that was extracted from the email address, or a variant thereof. The name of the XML index file is then included in the URL that is used to access the XML index file.

At steps 320-324, the received content is then processed and imported into the index file and/or a content file. This process can be performed in a variety of ways and the present invention is not limited to any particular method or technique.

In summary, in the personalized secure RSS feed, a web enabled company can retain their employment of content providers for their customer base, such as marketers and high-volume email providers.

RSS technology enables a user to selectively enable the reception of particular information. If a user elects to receive certain electronic content from a particular provider using an RSS feed, the user simply enters a URL corresponding to the desired RSS feed into his or her RSS reader, selects the interval for checking for new information, and then simply sits back and waits. In addition, with newer solutions like that available from YAHOO, the URL remains hidden and it is added to the RSS feed by simply clicking on a browser or icon. As new information becomes available in the XML index file associated with the RSS feed, the RSS reader detects the same and notifies the user. The user can then examine the title of the new content, review the summary or decide to download the entire message.

Within the context of the present invention, the user is able to selectively receive messages directed towards the user without relying on email messages as the medium. In operation, a user enters a URL into his or her RSS reader (step 350).

The company providing the RSS feed has the ability to password protect the various files associated with the RSS feed. If the RSS index file is password protected, at step 351 the accessing user is prompted for, or otherwise is required to provide a password to access the RSS feed. While the reader is configured to receive the RSS feed associated with the entered URL, the process simply passes through a continuous loop (decision block 352). At step 354, the continuous loop includes the step of examining the XML index file to determine if there is additional data, such as new articles available or previous articles or entries being modified, or data that has not previously been received or reviewed by the user, existing within the XML index file associated with the user. If new data exists, the process retrieves a webpage, and possibly the summary of the stored message. In addition, the user may receive a hyper-link, which can be imbedded within the summary or the entry in the XML index file, that will allow the user to download the entire web page or the content file. At step 358, if the user actuates one of the links, then the content file is retrieved and provided to the user. Similar to the RSS index file, the content file may also be password protected. Thus, at step 360, the user may be required to provide a password to access the content file. Advantageously, this aspect of the present invention allows users to control the reception of the data from various providers because the data is not obtained until the user actually enables the RSS feed of the data. Another aspect of the present invention is to provide a personalized RSS feed for a user based on generating a secure/secret URL for accessing the RSS feed. The portion of the secure/secret URL is referred to as a private identity code. The private identity code links a particular user with a particular content provider meaning that if a user accesses an RSS feed based on a particular private identity code, the content should be coming from a particular content provider. In operation, a user can provide a private identity code to a particular content provider to be used as the basis of an RSS feed for the user. The content provider, and the content provider alone, can utilize this private identity code in establishing an RSS feed for the subscriber. This is accomplished by the content provider creating an XML index file whose file name or URL includes the private identity code. To access the RSS feed, the user enters the URL into an RSS reader. One aspect of the private identity code is that the user has a significant level of assurance that someone else is not going to be able to guess his or her unique identity code and thus, subscribe to the user's personalized RSS feed—which could contain confidential information.

In another embodiment of this aspect of the present invention, rather than a user providing the private identity code, a unique character string can be generated and used to uniquely identify or define an RSS feed for a particular user and from a particular content provider or class of content providers. In this embodiment, when a new user subscribes to a particular personalized RSS feed, a character string or a random code is generated for the user and is associated with the user's login name or user ID. The random code can be any of a variety of sizes and can be generated using any of a variety of techniques. A significant element of this aspect of the invention is that the character string should be unique from other character strings generated for other users and, it should not be easily determinable.

As the size of the unique character string increases, and the sophistication of the generator matures, the character string can become more and more secure, in that it becomes exceedingly more difficult to guess or reverse engineer what user ID should be associated with the character string. In one embodiment of the present invention a character string of length 50 characters is utilized. Once the unique character string is created, the content provider sends data through an RSS feed in which the XML index file name is based on utilizing that particular character string. The user can control who is able to provide him or her information by deciding what personalized RSS feeds to enable. As a result, the user is not required to give out his or her email address nearly as often and as such, the user is then able to retain the usefulness of his or her standard email account and greatly limit the parties that are aware of the user's email address. The user can selectively determine what content to examine and the timing of when that content is brought to the user's attention through the use of the personalized RSS feeds.

Another variation of this aspect of the present invention is directed toward the creation of a unique or personalized feed for a user that already has a relationship with a content provider business. In such an embodiment, the user may already have a username and/or login name. The unique character string for such users needs to be able to be stored, retrievable, or at least regenerated in case the user forgets the value of the string. In one embodiment, a random unique ID is generated and stored into a database along with other user information already kept and maintained for each user. This information can include the name, address, telephone number, etc. of the user. A disadvantage of this embodiment is that existing databases will require some level of modification to operate with RSS feeds. In another embodiment, the unique string is generated as a hash function seeded by a unique and easily remembered input. In general, a hash algorithm takes an input value and produces a unique string. The goal of a good hashing function is to be collision free or at a minimum, have a very high probability that a collision will not occur. A collision is when a hash algorithm actually generates the same output value for more than one set of input values. By ensuring that the hash output has more characters than the hash input, this probability is greatly improved and can be guaranteed.

Because a hash algorithm is a one way mathematical manipulation, the actual user data cannot be recreated by reversing the hash algorithm. In addition, for a given input value, the hashing algorithm will always generate the same output value. Thus, if a user needs to create a unique ID, the user can provide input that is secure, but easily recalled by the user, to the hashing algorithm. If the input data consists of information that is already stored within the database entries for the use, the present database structure in current on-line systems would not have to be changed in order to implement such a system. The data that is already stored on behalf of a user or that is clearly recalled by the user and easily provided is also used to create the unique character string on the fly, as needed by the RSS catcher. Thus, this aspect of the present invention allows for the provision of the personalized RSS feeds without having to require IT departments to add RSS ID fields to their customer databases. Rather, the identity code for the RSS ID can be re-created on demand by re-hashing the ID or personal information a customer already has, such as the customers user name and a password or PIN. Thus, there is no requirement for a database schema change, the IT departments involvement can be minimized and no storage requirements for RSS ID are required.

In the embodiments presented herein, the RSS catcher of the present invention has been described as a server to server type system that receives input from a high-volume email system through and SMTP transfer. However, it should be appreciated that the present invention may also be incorporated into more local applications. For instance, an office server or even a personal computer assigned to a user can implement aspects of the present invention. For instance, if a user utilized MICROSOFT OUTLOOK as his or her primary email interface, the input to OUTLOOK may be obtained through a POP3 or IMAP type technology. The present invention can be incorporated into a system that sits between a user's personal computer and the POP3 or IMAP server. In operation, whenever the email utility attempts to extract email from the email server via POP3 or IMAP, particular email messages can be intercepted and converted into RSS feeds for the user. The email can be placed into various feeds depending on the content, title, sending party, etc.

It will also be appreciated that the present invention can operate to receive and incorporate into RSS feeds, data generated on the secure side of the firewall. For instance, if a web enabled company had highly confidential information to deliver and did not want to employ the services of an outside company, the web enabled company can generate the data internally and provide it to the RSS catcher in a predefined format. The RSS catcher can then receive the content and update/create XML index files accordingly.

Thus, the present invention provides a secure RSS catcher that can be used to receive over a secure communications channel, output generated by a content provider systems and convert this information into RSS feeds that can be subscribed to, enabled, and accessed as desired by users or intended recipients of the high-volume emailing. Advantageously, embodiments of the present invention allow a company to provide information to a user or customer, outside of the typical email channels and thus, easily separated out and not confused with SPAM. In addition, because the user subscribes to and enables the RSS feed from a particular company, the user's concerns over phishing emails are reduced. Another advantage of the present invention is that users can more easily define their SPAM filters while limiting the worry of actually filtering out valuable content. Any valuable content can be provided to the user through the RSS feeds pursuant to the present invention.

While the foregoing specification illustrates and describes the various embodiments of this invention, it is to be understood that the invention is not limited to the precise construction herein disclosed. The invention can be embodied in other specific forms without departing from the spirit or essential attributes. In addition, various aspects of the present invention have been described. Not all of the aspects are required to gain novelty and various embodiments may utilize on a subset of the various aspects. Accordingly, reference should be made to the following claims, rather than to the foregoing specification, as indicating the scope of the invention.

What is claimed is:

1. A system that provides the secured controlled delivery of content to a user, the system comprising:
   a content source that is operable to send pushed content items directed towards a user through the use of an address identifier for each content item and utilizing a secured communication channel;
   a hardware processor configured to implement a content catcher residing behind a firewall other than one protecting the content source and is operable to:
      receive a pushed content item through the secured communication channel, the pushed content being directed towards multiple recipients with the multiple recipients being identified uniquely by address identifiers in the received content item;
      generate a substantially unique identifier for each address identifier, based at least in part on at least a portion of the address identifiers within the pushed content item;

create an RSS based file for each recipient with each of the RSS based files having a URL that is based at least in part on the substantially unique identifier, thereby making each of the RSS based files private;

create, for at least one recipient, a plurality of RSS based files, wherein each RSS based file has a URL that is based at least in part on the substantially unique identifier;

convert the received pushed content item into an RSS file type; and place at least portions of the converted pushed content into various RSS feed destinations for a given recipient.

2. The system of claim 1, wherein the secured communication channel between the content source and the content catcher is a VPN thereby avoiding public disclosure of the content.

3. The system of claim 1, wherein the content catcher is operable to create an RSS based file by creating an RDF index file.

4. The system of claim 1, wherein the secured communication channel is a VPN.

5. A method for providing secured controlled delivery of content to a user, the method comprising the steps of:

receiving behind a firewall a content item generated and pushed from behind said firewall and directed towards a plurality of address identifiers, from a particular sending address, over a secured communication channel; and in response to receiving the content item, for each address identifier, determining if this is the first content item to be received for the address identifier from the particular sending address, and if this is the first content item:

based at least in part on at least a portion of the address identifiers within the pushed content item and the particular sending address, generate a substantially unique identifier for the address identifier and particular sending address pair;

create a URL that is based on the substantially unique identifier;

create an RSS based index file that is accessible via the URL; and place at least a portion of the content of the content item within the RSS based index file, whereby utilizing an RSS reader, a user associated with the address identifier can selectively receive the at least a portion of the content item without being vulnerable to SPAM or phishing.

6. The method of claim 5, wherein if in the examining step it is determined that this is not the first content item to be received for the address identifier from the particular sending address, further comprising the steps of:

performing a look up of a URL that is associated with the address identifier and particular sending address pair;

modifying an existing RSS based index file associated with the URL by placing at least a portion of the content of the content item within the RSS based index file.

7. The method of claim 5, wherein the step of generating a unique value further comprises generating the unique identifier based at least in part on a portion of the address identifier including at least a portion of the sender address identifier and the receiver address identifier.

8. The method of claim 5, wherein the step of generating a unique value further comprises generating the unique value based on the domain of the sender.

9. A system that provides the secured controlled delivery of pushed content items, the system comprising:

content items pushed from a source;

a hardware processor configured to implement a content catcher residing behind a firewall other than one protecting the content source and that is communicatively coupled to the content source using a secured communication channel, the content catcher being operable to:

receive pushed content items through the secured communication channel;

analyze the format and type of the pushed content items;

for pushed content items being directed towards one or more recipients with the one or more recipients being identified uniquely by address identifiers in the received content item:

generate a substantially unique identifier for each address identifier;

create a recipient specific RSS based file for each recipient with each of the recipient specific RSS based files having a URL that is based at least in part on the substantially unique identifier, thereby making each of the recipient specific RSS based files private; and place at least portions of the content items into the recipient specific RSS based files; and for one or more of the pushed content items having a portion placed into a recipient specific RSS based file:

generate an additional substantially unique identifier;

create a criteria specific RSS based file having a URL that is based at least in part on the additional substantially unique identifier; and place the one or more pushed content items into the criteria specific RSS based file.

\* \* \* \* \*